United States Patent [19]

Atwood et al.

[11] Patent Number: 4,713,177
[45] Date of Patent: Dec. 15, 1987

[54] PROCESS FOR MITIGATING SCALE FORMATION IN TUBE REACTION APPARATUS

[75] Inventors: Mark T. Atwood, Arvada, Colo.; Ronald H. Hall, Oakville, Canada

[73] Assignee: VerTech Treatment Systems, Inc., Denver, Colo.

[21] Appl. No.: 943,409

[22] Filed: Dec. 19, 1986

[51] Int. Cl.⁴ .............................................. C02F 5/04
[52] U.S. Cl. ..................................... 210/697; 210/761
[58] Field of Search ............... 210/679, 761, 762, 709, 210/737, 766, 739, 746, 698; 422/18

[56] References Cited

U.S. PATENT DOCUMENTS

| | | | |
|---|---|---|---|
| 3,606,999 | 9/1971 | Lawless | 210/761 X |
| 4,272,383 | 6/1981 | McGrew | 210/761 X |
| 4,442,009 | 4/1984 | O'Leary et al. | 210/697 |
| 4,543,190 | 9/1985 | Modell | 210/761 X |
| 4,547,294 | 10/1985 | Goeldner | 210/697 |
| 4,564,458 | 1/1986 | Burleson | 210/761 X |

Primary Examiner—Tom Wyse
Attorney, Agent, or Firm—Cullen, Sloman, Cantor, Grauer, Scott & Rutherford

[57] ABSTRACT

A process for reducing calcium, magnesium and aluminum salt scale build-up in continuous flow or plug flow tube reactors in which a fluid waste undergoes a chemical reaction under heat and pressure to form more environmentally desirable compounds. The process includes the injection of a precipitating reagent into the influent path of a fluid waste stream in a tube reactor to preferentially precipitate calcium, magnesium and aluminum ions which are then carried through and out of the reaction apparatus in a non-scale forming suspension.

19 Claims, 1 Drawing Figure

PROCESS FOR MITIGATING SCALE FORMATION IN TUBE REACTION APPARATUS

TECHNICAL FIELD

The present invention relates generally to processes for inhibiting the accumulation of surface scale and, more particularly, to processes for inhibiting the formation of various salt scales on the surfaces of wate reactors.

BACKGROUND OF THE INVENTION

Continuous fluid treatment apparatus include tube reactors in which wet oxidation or other chemical reactions occur in a fluid waste stream. For example, in U.S. Pat. No. 4,272,383 to Dr. Jay L. McGrew, entitled "Method and Apparatus for Effecting Subsurface, Controlled, Accelerated Chemical Reactions" (assigned to the assignee of the present invention), a vertical-tube reaction apparatus is disclosed that is the basis for the first successful verticaltube, subterranean, wet oxidation reaction system for municipal waste sludge, operated at Longmont, Colo. The aformentioned McGrew patent, which is expressly incorporated herein by reference, discloses an assembly of concentric pipes or tubes which extend into the earth to a depth of about 5,000 feet. These generally concentric tubes form separate vertical passages for an influent stream and an effluent stream in annuluses defined by the tube walls. Municipal waste sludge, or other fluid waste, is circulated through the apparatus by injection into the influent stream passage through which the waste flows downwardly in plug flow to a reaction zone at a depth of preferably between 3,000 to 6,000 feet, forming a hydrostatic column of considerable fluid pressure. In the reaction zone, a controlled, exothennic chemical reaction occurs which generates substantial heat. Reactor heat can be controlled with a heat-transfer jacket adjacent the reaction zone. The reaction products and any unreacted materials are then caused to flow up through the effluent stream passage and out of the reactor. The assignee of the instant application is also experimenting with above-ground plug flow tube reactors wherein the fluid waste is circulated in a generally circular path under pressure as disclosed in a co-pending application, wherein scaling problems are anticipated. One of the primary chemical reactions in processing municipal waste sludge for example is the wet oxidation of organic materials to produce simpler compounds that are more environmentally desirable. Municipal waste sludge commonly includes sulfur-containing organic compounds which are oxidized in a wet oxidation reaction to form sulfate ions. However, these sulfate ions tend to combine with ions of calcium, magnesium and aluminum, present as salts in the sludge, to form a scale which builds up on the wall surfaces of the reactor tubes.

In particular, anhydrous calcium sulfate, also referred to herein as anhydrite, forms when calcium and sulfate ions combine in the waste reactor as waste sludge moves through the reaction zone. It is known that the solubility of anhydrite decreases as temperature increases. Temperatures in the reactor generally exceed 300° F. and preferably are in excess of 500° F. during operation. Hence, anhydrite scale rapidly forms on the hot metal reactor surfaces. In addition to anhydrite scale, other types of scale form on the reactor tube walls as a result of other ions such as magnesium and aluminum which may also be present in municipal waste sludge. In the unique environment of the tube reactor, the accumulation of anhydrite and other scales on the walls of the reactor is a serious problem which reduces the efficiency of heat transfer and inhibits the flow of waste materials through the reactor tubes. In order to remove this unwanted build-up of scale, the reactor must be shut down for as long as twenty-four hours to permit the laborious removal of scale by nitric acid washes and the like. It would therefore be desirable to prevent to the extent possible the build-up of scale on the walls of the reactor.

Known scale inhibitors are not effective for use in inhibiting scale formation in high temperature environments such as a vertical tube waste reactor. These conventional compositions are generally organic compounds which for the most part are ineffective at temperatures above 300° F. As is known, organic scale inhibitors undergo thermal decomposition at high temperatures. Therefore, conventional organic scale inhibitors are unsuitable for use in preventing build-up of unwanted scale on the walls of tube reactors.

Thus, there is a need for a simple and effective process for inhibiting or mitigating scale formation on the walls of tube reactors so that the waste reaction process can continue uninterrupted by frequent de-scaling operations.

SUMMARY OF THE INVENTION

The process of this invention is particularly, although not exclusively, adapted for use in a continuous fluid treatment apparatus for wet oxidation of a fluid waste stream such as municipal waste sludge. Continuous fluid treatment of waste sludge in a tube reactor requires elevated temperatures and pressures in the influent stream, reaction zone and effluent stream. Temperatures in excess of 300° F., and typically between 500° and 575° F., are encountered in waste reactors, such as in vertical tube reactors where these high temperatures develope at depths of from 3,000 feet to 6,000 feet. Considerable pressure is also developed as a result of the fluid head. In accordance with the present invention a process for reducing scale formation in a tube reactor is provided which includes adding a precipitating reagent to fluid waste which is injected into the influent stream of a tube reactor. The precipitating reagent selectively precipitates calcium and other scale forming ions out of solution which would otherwise combine to form unwanted scale on the reactor walls. The precipitates flow through the reactor in suspension in the liquid waste.

It has been found that reagents which provide a source of phosphate or oxalate ions have unexpectedly superior scale inhibiting properties when used in tube waste reactors of the general type described herein. Therefore, in one embodiment the present invention provides a process by which a reagent which provides phosphate ions is injected into the influent stream of a continuous fluid waste reactor to inhibit scale growth on the reactor walls. The phosphate ion source may be added in the form of trisodium phosphate or, for greater economy, a mixture of phosphoric acid and sodium hydroxide can be added to the fluid waste. Alternatively, the precipitating reagent may contain sodium oxalate or a mixture of oxalic acid and sodium hydroxide to produce sodium oxalate. One important advantage in using sodium oxalate is that it is resists oxidation during the wet oxidation reaction which occurs in the tube reactor reaction zone.

According to one aspect of the present invention, the quantity of precipitating reagent required to inhibit scale formation is determined by comparing the concentration of calcium in the influent stream to the concentration of calcium in the effluent stream. From this comparison, the rate of scale formation in the reactor can be determined inferentially allowing the quantity of phosphate or oxalate ion source material which is added to the influent stream to be adjusted accordingly. The quantity of precipitating reagent which is added to the influent waste stream is preferably generally about 10% more than the stoichiometrically calculated quantity required to combine with the calcium contained in the influent waste stream. By providing a slight surplus of the precipitating reagent, rapid and substantially complete reaction of the reagent ions with the scale-forming ions is ensured while the reagent is conserved. The quantity of reagent added to the effluent waste stream may be adjusted to maintain the desired excess in accordance with periodic sampling and analysis of influent and effluent to determine calcium concentrations.

Hence, the present invention provides a process for inhibiting the formation of scale on tube reactors, such as plug flow vertical tube reactors, caused by the precipitation of ions, such as calcium, as sulfate salts, and the precipitation of other ions, such as magnesium and aluminum, as other scale-forming salts on the hot reactor walls at the reaction zone. This unwanted scale formation is inhibited by introducing a precipitating reagent into the influent waste stream to bind these ions before they can precipitate on the reactor walls. By in effect "pre-precipitating" scale-forming ions to form relatively insoluble compounds, the bound ions are harmlessly carried in suspension through the reactor waste stream.

While the preferred precipitating reagents for use herein are sodium phosphate or sodium oxalate compounds to form calcium, magnesium and aluminum phosphate or oxalate salts, it is anticipated that in some applications potassium phosphate and potassium oxalate compounds may be more suitable, particularly where the fluid waste stream is to be further processed by sodium-sensitive biological treatments for oxidation of ammonia.

DESCRIPTION OF THE PREFERRED EMBODIMENTS

Figure 1:
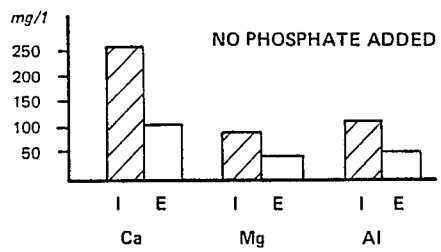
FIG. 1 is a graph showing the quantity of calcium, magnesium and aluminum ions in the influent and effluent when no reagent is added to the influent.

A continuous fluid treatment apparatus for which the present invention is particularly suited is a vertical plug flow tube reaction apparatus of the general type disclosed in U.S. Pat. No. 4,272,383 to McGrew, entitled "Method and Apparatus for Effecting Subsurface, Controlled, Accelerated Chemical Reactions", which is assigned to the assignee of the present invention, the disclosure thereof being expressly incorporated herein by reference. In substance, the disclosed continuous fluid treatment apparatus is used to carry out chemical reactions in a fluid waste stream in a series of generally concentric telescopically nested pipes or tubes vertically disposed beneath ground level. Fluid waste is introduced into the reactor as an influent stream which flows downwardly through an inner pipe to a reaction zone adjacent the bottom of the reactor at a depth of 3,000 to 6,000 feet. The processed waste is then circulated upwardly as an effluent stream through a second pipe which surrounds the inner pipe. In a wet oxidation reaction, air or oxygen is also injected into the downwardly flowing fluid waste stream. As heat and pressure build within the reactor the wet oxidation reaction begins as the fluid waste stream flows downwardly toward the reaction zone. As described above, however, the method or process of the invention may be used for any continuous flow reaction apparatus, particularly plug flow tube reactors.

Sulfur-containing organic materials processed in a wet oxidation reaction form sulfate ions as a by-product of the reaction. Moreover, many municipal waste sludges contain dissolved sulfate ions. In accordance with the present invention, a chemical reagent having a solubility product substantially less than that of calcium sulfate under influent waste stream conditions is introduced into the influent waste stream to preferentially precipitate the calcium ions from solution along with magnesium and aluminum ions which may be present in the influent waste stream. It is important to note that this precipitation reaction is carried out before the fluid waste reaches the reaction zone. That is, calcium, magnesium and aluminum ions are precipitated by the reagent in the somewhat cooler environment of the influent waste stream and the precipitates so formed by the precipitating reagent are carried through the waste reactor without forming scale on the reactor walls. It is preferred that the precipitating reagent from the desired precipitates at temperatures below that temperature at which scaling occurs in the reactor so that potential scale-forming ions are bound before they can form scale on the reactor walls. That is, it is preferred that the precipitating reagent form the desired precipitates with scale-forming ions at an influent stream temperature below that at which the scale-forming ions combine with other waste components to form unwanted scale on reactor walls. As stated, the substantially insoluble precipitates remain in suspension in the fluid waste stream throughout further processing in the reactor. These compounds are insoluble in the waste fluid under process conditions and thus the ions cannot participate in scale-forming reactions at the reactor walls with for example sulfates produced during thermal waste processing.

The solubility product of calcium sulfate at 18° to 25° C. is given as $9.1 \times 10^{-6}$ in the 12th edition of *Lange's Handbook of Chemistry*. It is known that the solubility product of calcium sulfate decreases as temperature increases, a property sometimes referred to as retrograde or inverse solubility. It is the inverse solubility of calcium sulfate in particular which contributes to the deposition of a hard anhydrite scale on the hot metal surfaces of the reactor in the reaction zone where temperatures may exceed 500° F. As stated, scale build-up reduces the efficiency of plug flow waste processing apparatus by reducing the efficiency of heat transfer in the reaction zone and by restricting the flow of fluid through the reactor tubes. The unwanted scale so formed may also include aluminum, magnesium, iron, various silicates and other salts in addition to anhydrite.

Thus the present invention provides a method which may be characterized as a self-cleaning process or the like which encompasses introducing a precipitating reagent into the influent waste stream of a tube reactor apparatus in a quantity sufficient to bind solubilized ions, most notably calcium ions. More specifically, a source of phosphate or oxalate ions is added to the influent waste at any convenient stage of the process in an amount effective to precipitate calcium, magnesium, aluminum and other ions before they can form insoluble sulfate salts and the like on the tube reactor walls. By precipitating these ions early in the waste processing sequence, they are carried through the reactor in suspension by the waste fluid.

One preferred chemical reagent suitable for use in the present invention is trisodium phosphate. When supplied to the influent waste stream trisodium phosphate forms calcium phosphate. The solubility product of $Ca_3(PO_4)_2$ at 18° to 25° C. is $2.0 \times 10^{-29}$ which is many orders or magnitude less than the solubility product of calcium sulfate at similar temperatures. As will be readily appreciated, the low solubility product of calcium phosphate is extremely effective in preferentially precipitating calcium ions in the influent waste in the present invention. Another preferred chemical reagent useful in the present method is sodium oxalate. A composition containing oxalic acid and sodium hydroxide is also suitable for use in the process of this invention. By adding a source of oxalate ions to the influent waste stream, calcium ions are preferentially precipitated out of solution because the solubility product of calcium oxalate ($4 \times 10^{-9}$) is lower than that of calcium sulfate. Formation of anhydrite scale is thereby efficiently and effectively inhibited by binding calcium ions in the influent stream particularly prior to the release of sulfate ions from the organic waste compounds during the wet oxidation reaction in the reaction zone.

In the most preferred embodiment phosphate ions are supplied to the waste influent by adding phosphoric acid and sodium hydroxide to the influent waste stream so that phosphate ions are generated at minimal cost. When the present invention is utilized in a wet oxidation reaction system in which an oxidizing gas such as oxygen or air is also added to the influent waste stream, the effectiveness of the process is enhanced by the turbulence, or mixing, which occurs when the gas is bubbled into the fluid waste stream. This mixing action facilitates bonding of the calcium, magnesium, aluminum and other scale forming ions with the oxalate or phosphate ions as the fluid waste stream moves downwardly toward the reaction zone.

Other precipitating reagents having low solubility products may be suitable for use herein in accordance with the principles of this invention to bind other potential scale forming ions which may be present in the fluid waste stream. These other reagents may be used alone or in combination with a phosphate or oxalate to accomplish the objects of the invention and their use is intended to be within the broader scope of this disclosure.

It is preferable to provide surplus or excess precipitating reagent in the influent waste stream to assure that all of the unwanted ions to be preferentially precipitated are precipitated prior to exposure to sulfate ions produced in the hot reaction zone of the apparatus. Hence, another aspect of the present invention comprehends a process for determining the quantity of precipitating reagent needed to bring about the desired reaction. A simple but efficient method of monitoring the waste stream of a tube waste reactor is provided to determine the quantity of precipitating reagent required to react substantially all of the scale producing ions in accordance with this invention. The quantity of reagent which must be added to the influent is determined by first analyzing a sample of the influent fluid waste stream quantitatively to ascertain the concentration of scale-forming ions. Once the influent concentration of scale-forming ions has been determined, the quantity of precipitating reagent necessary to bring about substantially complete reaction can be calculated stoichiometrically. It is preferred that an excess of reagent, over and above the stoichiometrically required quantity, be supplied to ensure substantially complete precipitation. The quantity of reagent should not be so large, however, that it interferes with the primary waste processing reaction in the apparatus or such that reagent is wasted. It is most preferred that the quantity of reagent supplied be approximately 10 percent greater than the stoichiometrically determined quantity of reagent necessary to preferentially precipitate all of the ions.

The following stoichiometric equation can be used to calculate the proper quantity of precipitating reagent to be added to the influent to bind calcium ions where the reagent is trisodium phosphate:

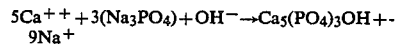

For example, in an influent waste stream having 240 mg of a calcium per liter of influent waste the stoichiometric calculations are as follows:

240 mg/l Ca ÷ 40 (mw of Ca) = 6 millimoles of Ca 6 millimoles Ca ÷ 5 moles Ca × 3 moles $PO_4$ = 3.6 millimoles $PO_4$ 3.6 millimoles $PO_4$ × 95 (mw of $PO_4$) = 342 mg/l $PO_4$ Similar equations will be apparent for the determination of the stoichiometrically required quantity of reagent necessary to bind aluminum and magnesium ions. Therefore, the stoichiometrically determined theoretical quantity of trisodium phosphate needed to bring about the desired reaction would be approximately 342 gm/l. To provide a ten percent surplus of reagent about 376 gm/l would be necessary. Therefore, an acceptable range for trisodium phosphate would be from about 345 to 380 grams per liter of fluid waste.

Figure 2:
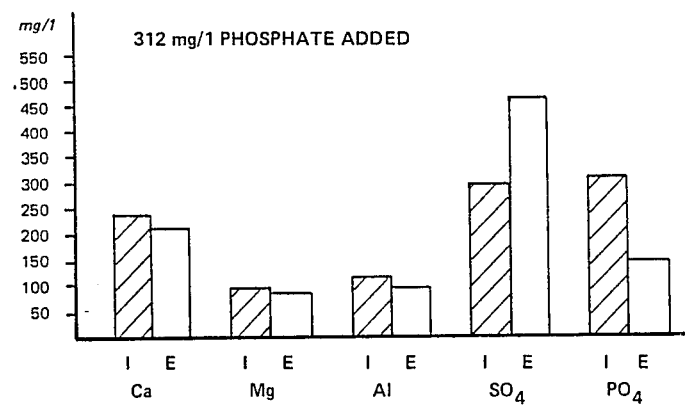
FIG. 2 is a graph showing the quantity of calcium, magnesium and aluminum ions in the influent and effluent when about 94% of the stoichiometric concentration of phosphate is added to the influent.
Figure 3:
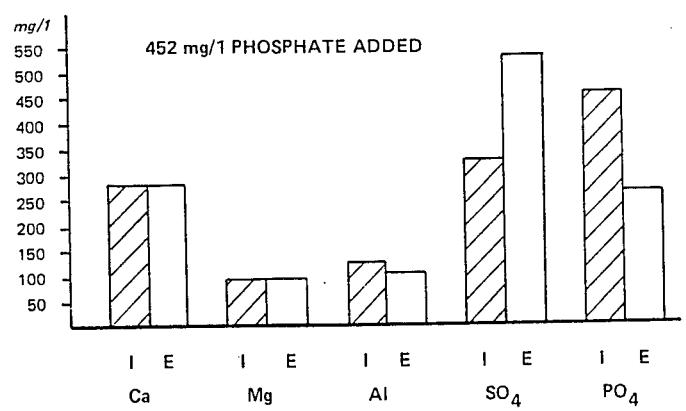
FIG. 3 is a graph showing the quantity of calcium, magnesium and aluminum ions in the influent and effluent when about 116% of the stoichiometric concentration of phosphate is added to the influent.

The method of the present invention is further explained below with reference to the following examples. FIGS. 1 through 3 are included to graphically illustrate the superior results achieved by present invention and to demonstrate that the extend of scale reduction is substantially proportional to the amount of excess phosphate ion present in the influent waste. The concentrations in the influent waste stream (I) are represented by crosshatching and the concentrations of the same elements or compounds in the effluent waste stream (E) are compared.

EXAMPLE I

The quantity of calcium, magnesium and aluminum present per liter of influent waste and effluent waste, respectively, in the processing of a municipal waste fluid in a vertical tube reaction apparatus which extends into the earth to a depth of about 5,000 feet is shown below.

|  | Ca mg/l | Mg mg/l | Al mg/l |
|---|---|---|---|
| Influent (I) | 247 | 83 | 96 |
| Effluent (E) | 99 | 33 | 38 |

In FIG. 1, this data is charted as a bar graph. It is apparent that substantial quantities of these substances were adhering to the reactor walls during processing.

EXAMPLE II

A reagent mixture of phosphoric acid and sodium hydroxide was added to a municipal waste fluid waste stream having the following influent components. The amount of reagent added provided 94% of the stoichiometrically required quantity of phosphate ions to precipitate all of the calcium, magnesium and aluminum ions in the influent. Note the superior results achieved as demonstrated by the concentration of effluent components:

|  | Ca mg/l | Mg mg/l | Al mg/l | Soluble SO$_4$ mg/l | Soluble PO$_4$ mg/l |
|---|---|---|---|---|---|
| Influent (I) | 232 | 78 | 89 | 301 | 312 |
| Effluent (E) | 214 | 75 | 78 | 463 | 150 |

FIG. 2 depicts the data graphically. The above example shows that when about 94 percent of the stoichiometric concentration of phosphate is added to the influent waste stream 92 percent of the calcium is maintained in the waste stream as indicated by the effluent concentration data. Only 8 percent of the calcium remained in the reactor for the possible formation of scale. Similarly, 96 percent of the magnesium and 87 percent of the aluminum remained in the waste stream as shown by the effluent concentration data.

The sulfate and phosphate components are soluble sulfate and phosphate. It is important to note that the soluble sulfate in the effluent is 153 percent of the soluble sulfate in the influent, thereby demonstrating that the soluble sulfate leaves the system as sulfate and does not form anhydrite scale. The decrease in the amount of soluble phosphate to 48 percent of the soluble phosphate in the influent indicates that the phosphate ions have combined with the scale forming calcium, magnesium and aluminum ions to form insoluble phosphates which are retained in suspension in the fluid waste.

EXAMPLE III

When the amount of phosphate added to the influent waste is increased to about 116 percent of the stoichiometrically required quantity, preferential precipitation of the calcium, magnesium and aluminum is achieved as follows:

|  | Ca mg/l | Mg mg/l | Al mg/l | Soluble SO$_4$ mg/l | Soluble PO$_4$ mg/l |
|---|---|---|---|---|---|
| Influent (I) | 273 | 89 | 113 | 317 | 452 |
| Effluent (E) | 272 | 89 | 105 | 527 | 258 |

The data is shown graphically in FIG. 3. This demonstrates that by adding a quantity of phosphate in excess of the stoichiometrically required concentration, the quantity of bound calcium and magnesium in the effluent is substantially 100 percent of the influent concentration while aluminum in the effluent is about 93 percent of that present in the influent. The quantity of soluble sulfate is 166 percent of the soluble component of the sulfate in the influent. Comparing the soluble phosphate in the influent with the soluble phosphate in the effluent indicates that adding an excess of phosphate results in a more complete preferential precipitation of the calcium and magnesium.

EXAMPLE IV

The following example was conducted in a laboratory scaling simulator apparatus comprising a 20 liter autoclave having flow through operation at pressures of 250 psi and interior temperatures of up to 288° C., plus or minus 15° C. The laboratory scale simulation was performed on a standard feed mixture of calcium acetate (Ca 200–250 mg/l), sodium sulfate (stoichiometric) and water, adjusted to a pH of 5 with acetic acid. The tests were run at 450° to 500° F. without the addition of air. The feed mixture remained in the simulator for thirty minutes. With the addition of oxalic acid and sodium hydroxide to the simulator, no adherent anhydrite scale was formed and only minimal calcium oxalate, scaling which was easily removed, was observed on the heated surfaces of the simulator. It is anticipated that this scale would be swept through the vertical tube reaction apparatus for discharge with the effluent.

Having described the preferred embodiments of the method of the present invention, it will be understood that various modifications may be made to the invention disclosed herein within the purview of the appended claims. As described, the method of the present invention may be used in various applications, however, the invention is particularly adapted for use in vertical tube reactors such as may be used for wet oxidation of municipal sludge. In general, the method of the present invention may be used in any continuous fluid treatment apparatus which converts various materials in a fluid reaction utilizing elevated temperatures and pressures.

What is claimed is:

1. A process for inhibiting scale formation in a continuous plug flow vertical tube waste reactor of the type in which liquid waste that contains scale-forming dissolved ions is injected into said reactor as an influent waste stream under heat and pressure to bring about a wet oxidation reaction within said liquid waste in a reaction zone in said reactor to break down said liquid waste into simpler components which are discharged from said reactor as an effluent waste stream, the process comprising adding a quantity of precipitating reagent to said liquid waste before said liquid waste enters said reaction zone and at a temperature significantly below the temperature of said reaction zone to form precipitates containing said ions which would otherwise accumulate as scale on the walls of said reactor.

2. The process for inhibiting scale formation recited in claim 1, wherein said precipitating reagent is a composition which forms precipitates with calcium, aluminum and magnesium ions and wherein said precipitates remain in suspension in said liquid waste.

3. The process for inhibiting scale formation recited in claim 1, wherein said quantity of precipitating reagent is at least equal to the quantity stoichiometrically required to bind all of said scale-forming ions in said liquid waste.

4. The process for inhibiting scale formation recited in claim 1, wherein said precipitating reagent is selected from the group consisting of phosphate ion producing compounds and oxalate ion producing compounds and combinations thereof.

5. The process for inhibiting scale formation recited in claim 1, wherein said precipitating reagent is selected from the group consisting of trisodium phosphate, a mixture of phosphoric acid and sodium hydroxide, and a mixture of oxalic acid and sodium hydroxide, and combinations thereof.

6. The process for inhibiting scale formation recited in claim 1, further comprising mixing said liquid waste after it is combined with said precipitating reagent to intimately contact said precipitating reagent with said scale-forming ions in said liquid waste.

7. The process for inhibiting scale formation recited in claim 6, wherein said mixing is achieved by adding said precipitating reagent to said liquid waste and bubbling a gaseous stream through said liquid waste to cause said precipitating reagent to be substantially uniformly distributed throughout said liquid waste.

8. The process for inhibiting scale formation recited in claim 7, wherein said gaseous stream includes a gas selected from the group consisting of air and oxygen.

9. The process for inhibiting scale formation recited in claim 1, wherein said precipitating reagent forms said precipitates with said ions when the temperature of said influent waste stream is less than that temperature at which said scale forms on said reactor walls.

10. A process for continuously inhibiting the growth of chemical scale on the walls of a continuous flow tube reactor of the type in which liquid waste is introduced as an influent waste stream to form a plug flow of liquid waste at elevated temperature and pressure to cause said liquid waste to react in a reaction zone to form more environmentally desirable components which are then carried out of said reactor as an effluent waste stream and wherein said liquid waste of said influent stream contains ions of calcium, aluminum and magnesium in solution, the process comprising the steps of:
(a) analyzing said influent stream to determine the concentration of calcium, aluminum and magnesium present;
(b) substantially continuously adding to said influent stream a precipitating reagent which forms precipitates with said calcium, aluminum and magnesium ions at a temperature below about 300° F. in a quantity substantially equal to the stoichiometric quantity required to bond all of the calcium, aluminum and magnesium determined in step (a) to be present in said influent waste stream;
(c) analyzing said effluent stream to determine the concentration of calcium, aluminum and magnesium present;
(d) comparing the concentration data obtained in step (a) with the concentration data obtained in step (c)
(e) adjusting the quantity of precipitating reagent that is substantially continuously added to said influent waste stream and repeating steps (c), (d) and (e) until the concentration of calcium, aluminum, and magnesium in said effluent stream is substantially equal to the concentration of calcium, aluminum and magnesium in said influent stream.

11. The process recited in claim 10, wherein the quantity of precipitating reagent which is added to said influent waste stream is from about 100% to about 125% of the stoichiometric concentration required to bind all of the calcium present in said influent waste stream.

12. The process recited in claim 10, further comprising the step of mixing said influent waste stream between steps (b) and (c) to promote the reaction of said precipitating reagent with said calcium ions.

13. A process for the wet oxidation of liquid municipal waste in a vertical tube waste reactor of the type having a series of concentric reactor tubes partially buried vertically in the ground in which the formation of salt scale on the reactor walls is inhibited comprising adding a composition to said liquid municipal waste which binds scale-forming ions present in said waste before said waste undergoes wet oxidation in said vertical tube waste reactor.

14. In a fluid waste treatment apparatus of the type in which fluid waste containing scale-forming ions enters a reaction zone where it is reacted with an oxidizing gas at an elevated temperature to produce a wet oxidation reaction to form a treated fluid waste, a process for inhibiting the formation of scale on the surfaces of the fluid waste treatment apparatus, the process comprising the steps of:
(a) introducing the fluid waste into the fluid waste treatment apparatus as an influent fluid waste stream;
(b) adding to the fluid waste a quantity of precipitating reagent sufficient to form substantially insoluble suspended precipitates with the scale-forming ions in the fluid waste before said fluid waste enters said reaction zone;
(c) adding the oxidizing gas to the fluid waste to participate in the wet oxidation reaction;
(d) flowing the influent fluid waste stream containing the precipitants and the oxidizing gas through the fluid waste treatment apparatus to the reaction zone;
(e) reacting the fluid waste with the oxidizing gas in the reaction zone by increasing the temperature of the influent fluid waste stream in the reaction zone to produce the wet oxidation reaction;
(f) removing the treated fluid waste containing the suspended precipitates from the fluid waste treatment apparatus as an effluent waste stream;
whereby said scale-forming ions are bound as said insoluble precipitates by said precipitating reagent and are carried in suspension through said waste treatment apparatus so that said scale-forming ions cannot combine to form scale on the surfaces of said waste treatment apparatus.

15. The process for inhibiting the formation of scale on the surfaces of a fluid waste treatment apparatus recited in claim 14, wherein said precipitating reagent added to said fluid waste in step (b) is selected from the group consisting of trisodium phosphate and sodium oxalate.

16. The process for inhibiting the formation of scale on the surfaces of a fluid waste treatment apparatus recited in claim 14, wherein said oxidizing gas is selected from the group consisting of oxygen and air.

17. The process for inhibiting the formation of scale on the surfaces of a fluid waste treatment apparatus recited in claim 14, further comprising the step of mixing said fluid waste containing said precipitating reagent following step (b) to intimately contact said precipitating reagent and said scale-forming ions to precipitate substantially all of said scale-forming ions.

18. The process for inhibiting the formation of scale on the surfaces of a fluid waste treatment apparatus recited in claim 14, wherein said oxidizing gas added in step (c) is bubbled as a gaseous stream into said fluid waste to intermix said oxidizing gas and said fluid waste.

19. The process for inhibiting the formation of scale on the surfaces of a fluid waste treatment apparatus recited in claim 14, wherein said reacting step (e) takes place when the temperature of said fluid waste is less than that temperature at which scale forms on said surfaces of said fluid waste treatment apparatus.

* * * * *